United States Patent
Matheisl et al.

(10) Patent No.: US 9,944,496 B2
(45) Date of Patent: Apr. 17, 2018

(54) TRACK SYSTEM FOR AN ESCALATOR OR A MOVING WALKWAY

(71) Applicant: Inventio AG, Hergiswil (CH)

(72) Inventors: Michael Matheisl, Vösendorf (AT); Norbert Frim, Vienna (AT); Thomas Illedits, Neufeld (AT); Uwe Hauer, Nienburg (DE); Robert Schulz, Vienna (AT); Michael Berger, Königstetten (AT); Christoph Makovec, Wiener-Neustadt (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/307,517

(22) PCT Filed: Mar. 10, 2015

(86) PCT No.: PCT/EP2015/054966
§ 371 (c)(1),
(2) Date: Oct. 28, 2016

(87) PCT Pub. No.: WO2015/165631
PCT Pub. Date: Nov. 5, 2015

(65) Prior Publication Data
US 2017/0043981 A1    Feb. 16, 2017

(30) Foreign Application Priority Data

Apr. 30, 2014   (EP) .................................... 14166527

(51) Int. Cl.
*B66B 23/14*   (2006.01)
*B65G 21/02*   (2006.01)
(Continued)

(52) U.S. Cl.
CPC .............. *B66B 23/14* (2013.01); *B65G 21/02* (2013.01); *B65G 21/06* (2013.01); *B66B 21/02* (2013.01); *B66B 21/10* (2013.01); *B66B 23/00* (2013.01)

(58) Field of Classification Search
CPC ......... B66B 21/02; B66B 21/04; B66B 21/10; B66B 23/00; B66B 23/14; B65G 21/02; B65G 21/06
See application file for complete search history.

(56) References Cited

U.S. PATENT DOCUMENTS 2,023,067 A * 12/1935 Dunlop .................. B66B 23/14
198/329
6,374,981 B1 * 4/2002 Gschwendtner ........ B66B 23/00
198/321
(Continued)

FOREIGN PATENT DOCUMENTS

CN    1283582 A    2/2001
CN    1868853 A    11/2006
(Continued)

*Primary Examiner* — Leslie A Nicholson, III
*Assistant Examiner* — Keith R Campbell
(74) *Attorney, Agent, or Firm* — Williams J. Clemens; Shumaker, Loop & Kendrick, LLP

(57) ABSTRACT

An escalator with a step belt or a moving walkway with a plate belt has a first deflecting region and a second deflecting region, wherein the plate belt or the step belt is arranged to circulate between the first deflecting region and the second deflecting region. The escalator or the moving walkway includes at least one guide rail arranged between the deflecting regions for guidance of the step belt or the plate belt, as well as at least one support, which is arranged between the deflecting regions for supporting the at least one guide rail. The at least one support includes a plurality of plug parts that in an assembled state can be plugged together by plug connections to form a box-shaped support base body.

16 Claims, 5 Drawing Sheets

(51) Int. Cl.
  *B65G 21/06* (2006.01)
  *B66B 23/00* (2006.01)
  *B66B 21/02* (2006.01)
  *B66B 21/10* (2006.01)

(56) References Cited

U.S. PATENT DOCUMENTS

| | | | | |
|---|---|---|---|---|
| 7,300,237 | B2 * | 11/2007 | Illedits | F16B 39/10 |
| | | | | 411/166 |
| 7,431,139 | B2 * | 10/2008 | Streibig | B66B 23/14 |
| | | | | 198/326 |
| 8,042,675 | B2 * | 10/2011 | Gonzalez Alemany | |
| | | | | B66B 23/14 |
| | | | | 198/332 |
| 8,919,527 | B2 * | 12/2014 | Heinemann | B66B 23/14 |
| | | | | 198/321 |
| 9,193,568 | B2 * | 11/2015 | Inoue | B66B 23/14 |
| 9,457,995 | B2 * | 10/2016 | Makovec | B66B 23/14 |
| 2010/0322747 | A1 * | 12/2010 | Lert | B65G 1/045 |
| | | | | 414/273 |
| 2012/0168277 | A1 * | 7/2012 | Senger | B66B 23/00 |
| | | | | 198/321 |
| 2013/0283597 | A1 * | 10/2013 | Denslow | B21J 15/02 |
| | | | | 29/524.1 |
| 2015/0239711 | A1 * | 8/2015 | Makovec | B66B 23/00 |
| | | | | 198/326 |
| 2016/0264380 | A1 * | 9/2016 | Sipila | B66B 23/00 |

FOREIGN PATENT DOCUMENTS

| | | |
|---|---|---|
| CN | 101412484 A | 4/2009 |
| EP | 2050708 A2 | 4/2009 |
| JP | 2003137488 A | 5/2003 |
| JP | 2006327792 A | 12/2006 |
| WO | 2013103016 A1 | 11/2013 |
| WO | 2014048809 A1 | 4/2014 |
| WO | 2015100749 A1 | 7/2015 |

* cited by examiner

TRACK SYSTEM FOR AN ESCALATOR OR A MOVING WALKWAY

FIELD

The invention relates to an escalator with step belt or a moving walkway with a plate belt, to an assembly method and to a modernization method for escalators and moving walkways. The escalator or the moving walkway has in the length direction thereof balustrades arranged laterally of the step belt or plate belt as well as a first deflecting region and a second deflecting region. The plate belt or the step belt is arranged to circulate between the first deflecting region and the second deflecting region. In addition, the escalator or moving walkway includes at least one guide rail, which is arranged between the deflecting regions, for guidance of the step belt or plate belt.

BACKGROUND

Escalators and moving walkways of the aforesaid kind comprise a support structure, for example a framework, at and in which the stationary components such as guide rails, bearing blocks and the balustrades, as well as the moved components such as the step belt or plate belt, the deflecting axle and parts of the drive, are arranged.

In, for example, EP 2 050 708 A2 there is disclosed a moving walkway having a support structure which includes two longitudinal profile members extending in the longitudinal direction of the moving walkway. The longitudinal profile members are connected together by means of transverse struts and form a self-supporting stable frame. Guide tracks for guidance of the step belt are formed in the longitudinal profile members. In addition, fastening regions for feet and for balustrade supports are provided at the longitudinal profile members. This frame can also be divided into several sections or frame modules which can be joined together at the ends.

The construction disclosed in EP 2 050 708 A2 has the disadvantage that these longitudinal profile members have to be constructed to be very stiff in bending and torsion, since transverse forces acting on the balustrade and oriented orthogonally to the direction of running of the moving walkway have to be supported by the vertical sections of the cross-section of the longitudinal profile member. Such transverse forces are caused by, for example, users who are leaning on the balustrade, by impacts on the balustrade and the like and, due to the usual constructional height of the balustrade, act as high bending moments or bending forces on the longitudinal profile members. The necessary stiffness in bending and torsion has the consequence that these longitudinal profile members have a high weight per running meter due to a large cross-section and a large wall thickness of the profile member and handling is thus made very difficult. In addition, such profile members are very costly in production and processing and require costly production means such as press tools, press dies, bending tools, assembly templates and clamping tools.

A moving walkway is disclosed in WO 2014 048 809 A1, the balustrades of which are supported on a load-bearing structure by means of supports and the guide rails of which are fastened to these supports. These supports, which are made from angle profile members, are sufficiently stiff for moving walkways of flat construction, which are exposed to low levels of load such as arise in use in, for example, smaller department stores. Supports for moving walkways in public facilities such as, for example, airports have to have a high level of stiffness in bending and buckling so that the supports are not deformed when the plate belt has dense occupancy. The same also applies to the escalators disclosed in WO 2014 048 809 A1, since the supports, due to the inclined setting thereof, are also loaded in bending by the mass of the guide rails to be supported and in a given case the mass of the balustrades. In order to achieve the necessary stiffness with respect to buckling the supports illustrated in WO 2014 048 809 A1 and consisting of angle profile members therefore have to have very substantial wall thicknesses for this field of use, which, however, would mean a huge increase in weight.

SUMMARY

An object of the present invention is therefore to create an escalator or a moving walkway of the aforesaid kind, the supports of which are produced extremely accurately, are stable in shape, stiff with respect to buckling, compact in dimensions, able to be easily produced, economic and have a low weight.

This object is fulfilled by an escalator with a step belt or by a moving walkway with a plate belt, which has a first deflecting region and a second deflecting region, wherein the plate belt or the step belt is arranged to circulate between the first deflecting region and the second deflecting region. In addition, the escalator or the moving walkway comprises at least one guide rail, which is arranged between the deflecting regions, for guiding the step belt or plate belt, as well as at least one support, which is arranged between the deflecting regions, for support of the at least one guide rail.

In order to fulfil the afore-mentioned demands on the support the at least one support comprises a plurality of plug parts which in the assembled state can be plugged together by means of plug connections to form a box-shaped support base body. The feature "box-shaped" describes the three-dimensional structure of the support over the height dimension thereof. The support thus has, after plugging together of the plug parts, a tubular, C-profiled or H-profiled support cross-section. Extremely simple and highly accurate support production is possible through the plug connections. Most plug parts are preferably sheet-metal parts or plate parts, in which different cut-outs, recesses, tongues, screw holes, slots and the like are cut at the same time as cutting out of the plug part. The plug parts can be cut out by means of, for example, laser-beam or water-jet cutting methods from sheet-metal plates of steel, non-ferrous-metal or aluminum. The plug parts can obviously also be produced from other materials such as, for example, fiber-reinforced synthetic materials.

Thanks to the plug connections the plug parts can be joined together with precise fit and free of distortion to form the support base body. Through this construction it is possible to produce supports with a level of accuracy which is never achievable with, for example, a welded construction of profile members and of plates, since the support base body consisting of pluggable plug parts does not have to be penetration-welded and is therefore free of distortion. The plug connections are designed in such a way that the tension forces, compression forces, shear forces, bending moments and torsion moments arising between the plug parts are mechanically positively accepted by the plug connections except in the assembly direction of the plug connection.

By virtue of these accurately produced supports the components of the escalator or the moving walkway can be assembled without problems and the outlay with respect to adaptation, orientation and setting operations is reduced to a minimum. Beyond that, after joining together of the plug parts no material-removing and costly reprocessing is required at the base body itself in order to be able to attach further parts.

For reference, in order to achieve a connection of the plug parts which is as stable and load-bearing as possible at least two plug connections are provided between two mutually adjacent plug parts to be joined together.

Each of the plug connections comprises a tongue and a recess matched to this tongue to be interlocking. The recess is formed at one of the plug parts of the support, which are to be joined together. The tongue to be plugged into this recess is formed at a further plug part of the support, which in assembled state is arranged adjacent to the plug part with the tongue.

The at least one plug connection is preferably designed so that the tongue of the plug connection is insertable into the recess only in a single assembly direction. Two advantages can thereby be achieved. Firstly, there is consequently only a single possibility of how two adjacent plug parts can be joined together. Thus, the support base body can also be joined by less qualified employees. Secondly, the plug connection can be so arranged between two plug parts that the assembly direction thereof is oriented parallelly to the direction of that axis of the triple-axis stress state in which the lowest stresses arise as a consequence of forces and moments acting on the support base body. Thus, almost all forces and moments arising in this plug connection are accepted by the mechanically positive couple of the plug connection or are supported within the plug connection.

A joined-together plug connection can therefore be secured by the simplest means, since only 'slipping out' or sliding out of the tongue from the recess has to be prevented and no substantial tension, compression or shear forces have to be transmitted by the securing means to be applied. For preference, at least one of the plug connections of the support base body is secured by way of securing means providing a material couple or mechanically positive couple. As securing means providing a material couple use can be made of, for example, weld seams, weld spots (adhesion points), adhesives, solder connections, plastics material coatings applied by dip processes and the like. As securing means providing a mechanically positive couple use can be made of, for example, deformations of the tongues of all kinds such as crushings, upsettings, clinching points, bent-over straps formed at the tongues and the like. In addition, highly qualified specialist employees such as, for example, registered and certified welders are not essential for securing the plug connections.

In order that no additional connecting parts such as, for example, spars, gusset plates or brackets are needed the support can have at least one rail fastening region for fastening the at least one guide rail. Consequently, guide rails and optionally transverse struts, which are arranged transversely to a length dimension of the moving walkway or the escalator, can be installed by means of supports in the entire area between the two deflecting regions. In order to further simplify assembly, hooks serving for suspension of a guide rail are preferably formed in the rail fastening region. The suspended guide rails can then be firmly connected with the support by means of fastening elements such as screws, clamping claws, clamping wedges, clamping pins, spring clips and the like. Obviously, non-releasable connecting techniques can also be used, such as, for example, riveting, welding, gluing, clinching and the like.

In the assembled state at least one transverse strut can be arranged between at least two supports orthogonally to the length direction of the escalator or the moving walkway and connect together these supports. The spacing of the supports from one another and thus the track width of the guide rails are precisely defined by the at least one transverse strut.

In order that the transverse strut is directly fastenable to the supports, but the supports do not protrude into the region of the step belt or plate belt, the guide rail can have at least one passage for guidance therethrough of the at least one transverse strut. Insofar as the size of the passage is matched to the cross-section of the transverse strut the guide rail protrudes at the transverse strut when forces acting on the guide rails seek to lift them out of the hooks of the rail fastening region. The guide rail suspended at the support is thus secured to the support by the transverse strut connected with the support. Additional connecting elements such as, for example, screws can thereby be saved.

However, the guide rail can obviously also be fastened or additionally secured to the support by screws or rivets.

In order to still further simplify assembly the at least one guide rail can be of C-shaped cross-sectional construction and have two guide tracks, which are arranged on its two limbs, for guide rollers of a step belt or plate belt.

Further components of the escalator or the moving walkway can obviously also be fastened to the support. For example, at least one balustrade fastening region for fastening at least one balustrade part can be formed at the support. This balustrade fastening region can be a clamping device for fastening at least one glass panel of a glass balustrade, wherein the stationary part of this clamping device is preferably formed directly by plug parts of the support base body. For completion of the clamping device then merely a movable clamping jaw and at least one fixing screw have to be additionally inserted in the region of the support base body provided for that purpose.

Moreover, at least one pedestal fastening region for fastening a skirt panel can be formed at the support. Since, due to the extremely accurate production of the support base body, hardly any adjusting work is needed and the skirt panel can be directly fastened to the support base body. The skirt panel can obviously also be constructed to be adjustable relative to the support so as to provide compensation for production tolerances and a gap corresponding with legal requirements can be set between the step belt and the skirt panel.

The support can also have at least one handrail-guide fastening region for the fastening of a handrail guide. This handrail guide can be a guide rail, one or more guide rollers, handrail mounts, handrail support parts and the like.

The support preferably has a foot fastening region for fastening of the support to a load-bearing structure, which is provided at the building, of a construction. This foot fastening region can include a height adjusting device or height setting device which enables adjustment of the support in vertical direction. Compensation for unevenesses of the load-bearing structure over the length of the escalator or the moving walkway can thereby be provided in simple manner without having to use additional materials such as spacer plates, spacer sleeves, washers, wedges and the like.

The escalator or the moving walkway can comprise at least one track module. This track module is formed from at least two support structures and at least one guide rail. Each support structure includes two supports connected with a transverse strut, wherein the at least one guide rail is arranged in the track module orthogonally to the transverse struts and is fastened to the rail fastening regions of the supports. The track module can, during assembly, be fastened to the load-bearing structure separately from the deflecting regions. Installation of the escalator or moving walkway is thereby significantly facilitated. In the installed state one or more track modules are arranged between the deflecting regions. The deflecting regions are, in addition, connected together by the track modules.

During installation of the escalator or the moving walkway in a construction the first deflecting region, the second deflecting region and at least one support are fastened to associated mounts. These mounts are arranged in distribution over the length of a load-bearing structure provided at the building. Moreover, the at least one guide rail arranged between the deflecting regions is fastened to the at least one support.

Insofar as the balustrade is fastened to the at least one support this supports static and dynamic loads acting on the balustrade, such as, for example, transverse forces and bending moments acting, by way of the foot fastening region directly on the load-bearing structure, which can be, for example, a steel beam, a concrete foundation, a sufficiently stable floor and the like. The guide rails are fastened only to the rail fastening regions of the support structures and are thereby excluded from these transverse forces and bending moments. Correspondingly, the guide rails can be designed primarily for loads through the step belt or plate belt, which results in a simpler construction and lighter components.

The production and assembly of a support of an escalator or a moving walkway can comprise the following steps:
  the plug parts required for producing the support base body are cut out of a flat metal sheet, wherein recesses and projections or tongues of the plug connections of a plug part are formed by the cutting out at the plug part,
  insofar as required, the plug parts of the support base body are bent or shaped at intended locations,
  in addition, the plug parts of the support base body are plugged together by means of the plug connections formed thereat to form a box-shaped support base body,
  in a further step at least one of the plug connections can be secured,
  the support base body can optionally be provided with a surface treatment and
  for completion of the support optionally further components can be fastened to the support base body.

As already mentioned, the at least one plug connection to be secured can be secured by securing means providing a mechanically positive couple or material couple. As securing means providing a material couple use can be made of, for example, weld seams, weld spots (adhesion points), adhesives and the like. As securing means providing a mechanically positive couple use can be made of, for example, deformations of the tongues of all kinds such as crushings, upsettings, clinching points, bent-over straps formed at the tongues and the like. Use can obviously also be made of rivets, fit pins or screws for the securing, even if securing without additional components is preferred.

The escalator or the moving walkway of the aforesaid kind is also particularly suitable for modernization of an existing escalator or an existing moving walkway.

Such a modernization method comprises the steps:
  an existing escalator or an existing moving walkway is removed down to the framework or support structure and optionally cleaned and restored,
  the vacated framework, serving as a load-bearing structure, is provided in the region of its lower chord with mounts to which the foot fastening regions of supports with a support base body of plug parts can be fastened and
  a first deflecting region, a second deflecting region, and—insofar as preassembled beforehand—at least one track module or supports with a support base body consisting of plug parts, transverse struts and guide rails are fastened in the vacated framework provided with mounts, wherein the foot fastening regions of the supports are connected with the mounts.

DESCRIPTION OF THE DRAWINGS

The escalator or moving walkway with a light, accurate and economic structure, which is arranged between the deflecting regions and which comprises supports consisting of plugged-together plugged parts, is explained in more detail in the following by way of examples and with reference to the drawings, in which.

DETAILED DESCRIPTION

Figure 1:
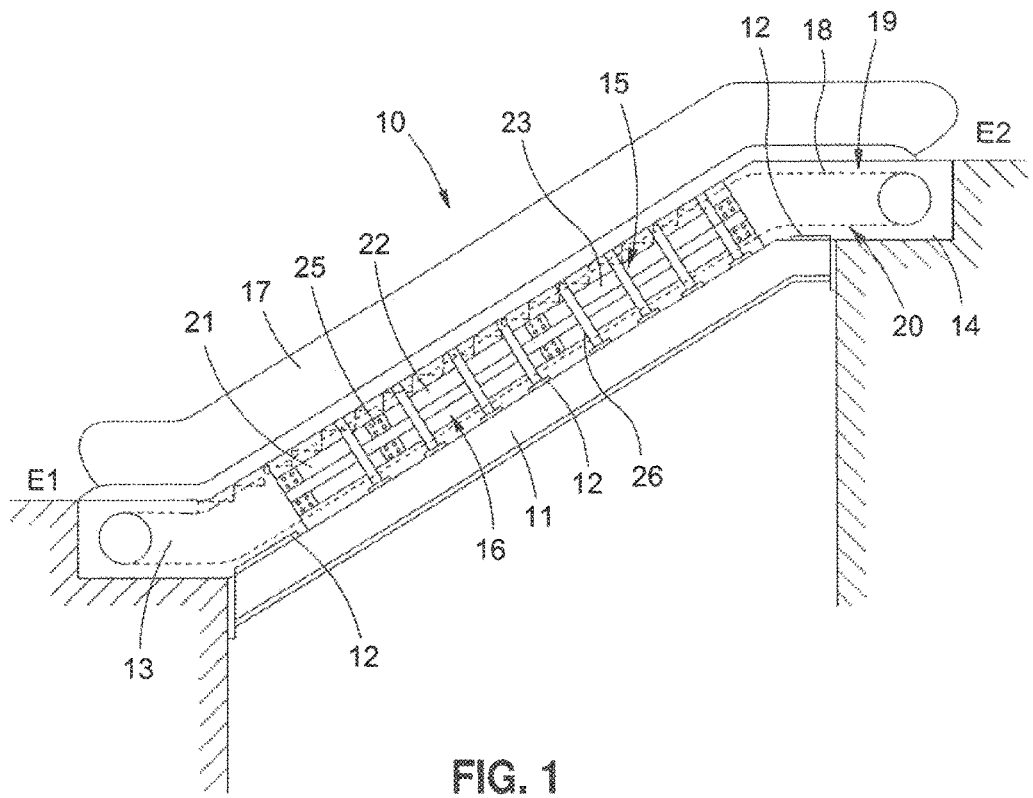
FIG. 1 shows, in side view and in schematic illustration an escalator which is arranged on a load-bearing structure and which comprises supports, transverse struts, guide rails, balustrades and an encircling step belt, which are arranged between a first deflecting region and a second deflecting region.

FIG. 1 shows, in schematic illustration in side view, an escalator 10, which is arranged on a load-bearing structure 11 and which connects a lower level E1 with an upper level E2. The load-bearing structure 11 is designed as, for example, a simple I-beam in order to clearly show that this load-bearing structure 11 can allow design freedom to the architect. The load-bearing structure 11 can obviously also be a concreted stairway, a concrete ramp, a framework or a bridge of free design. The load-bearing structure 11 has to fulfil specific requirements with respect to its stiffness and loading, which the manufacturer of the escalator or the moving walkway prescribes for the architect.

Mounts 12, on which the parts of the escalator 10 are mounted, are to be provided or subsequently fitted to this load-bearing structure 11, which is to be provided at the building. For the sake of better clarity only three mounts 12 are provided with reference numerals, although in the present example a mount 12 is present for each of the supports 26 described in the following. The mounts 12 can be simple mounting plates which, for example, are directly connected with the reinforcing of the load-bearing structure 11. Other suitable mounts 12 such as concrete anchors, screw holes, threaded rods, weld plates and the like can obviously also be used.

The escalator 10 comprises a first deflecting region 13 and a second deflecting region 14 as well as support structures 15, guide rails 16, balustrades 17 and an encircling step belt 18 arranged between the deflecting regions 13, 14. For the sake of clarity only one support structure 15 is provided with a reference numeral. The step belt 18 is turned around in the upper level E2 and in the lower level E1 and thus has a step-belt forward run 19 and a step-belt return run 20. A detailed illustration of the step belt 18 was dispensed with for reasons of clarity.

Figure 2:
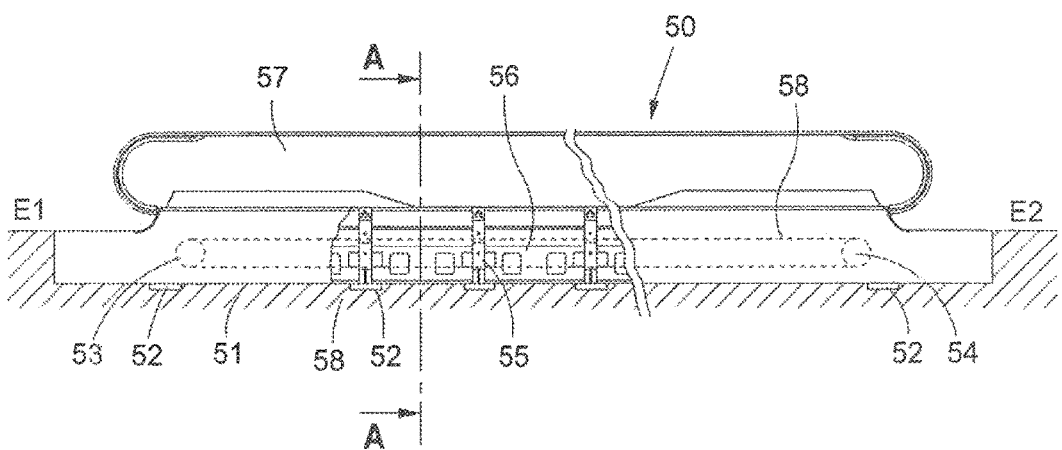
FIG. 2 shows, in side view and in schematic illustration a moving walkway which is arranged on a load-bearing structure and which comprises supports, transverse struts, guide rails, balustrades and an encircling step belt, which are arranged between a first deflecting region and a second deflecting region.

It is clearly evident from FIG. 1 that the guide rails 16 are subdivided into guide-rail sections 21, 22, 23 and are screwed or connected together by means of connecting plates 25. The guide-rail sections 21, 22, 23 preferably have the same length, but as evident in FIG. 1 they can also have different lengths. The guide rails 16 are supported by a plurality of support structures 15 at the load-bearing structure 11. Of the support structures 15, merely the supports 26 oriented towards the viewing plane are visible, for which reason the support structures 15 are explained in more detail only further below in the description of FIGS. 3 and 4. There, in fact, support structures 55 of the moving walkway 50 illustrated in FIG. 2 are described, but the construction and function of the support structures 15 of the escalator 10 correspond with the support structures 55 shown and described in FIGS. 3 and 4. Each of the supports 26 has a foot fastening region which, as illustrated, is rigidly connected with the associated mount 12 of the load-bearing structure 11.

FIG. 2 shows in side view in schematic illustration a moving walkway 50 which is arranged on a load-bearing structure 51. Serving as load-bearing structure 51 is a floor with a pit, which has sufficient strength. The moving walkway 50 can obviously also be mounted on one of the load-bearing structures as explained in the description with respect to FIG. 1. The moving walkway 50 can also be mounted on a flat floor without a pit when the moving walkway is arranged between two ramps. The two ramps are recommended so that the users can conveniently reach the height or level of the plate belt 58. The floor 51 also has mounts 52 to which the components of the moving walkway 50 are fastened. Belonging to these components are a first deflecting region 53 and a second deflecting region 54 as well as support structures 55, guide rails 56, balustrades 57 and the encircling plate belt 58 arranged between the deflecting regions 53, 54. The construction of the moving walkway 50 thus substantially corresponds with the construction of the escalator 10 described in FIG. 1, even if in the present embodiments of FIGS. 1 and 2 for the escalator 10 two guide rails 16 are illustrated arranged one above the other and for the moving walkway 50 only one guide rail 56 is illustrated.

The guide rails 56, which are illustrated in FIG. 2, of the moving walkway 50 can also be divided into guide-rail sections. Like the guide-rail sections of the escalator, these are supported by the support structures 55, the foot fastening regions of which are fastened to the mounts 52. If the individual guide-rail sections and the support structures 55 associated therewith are already joined together in the manufacturer works to form track modules the transport from the manufacturer to the place of installation and the assembly of the moving walkway 50 or the escalator 10 on the load-bearing structure 11, 51 provided at the place of installation can be substantially simplified.

Figure 3:
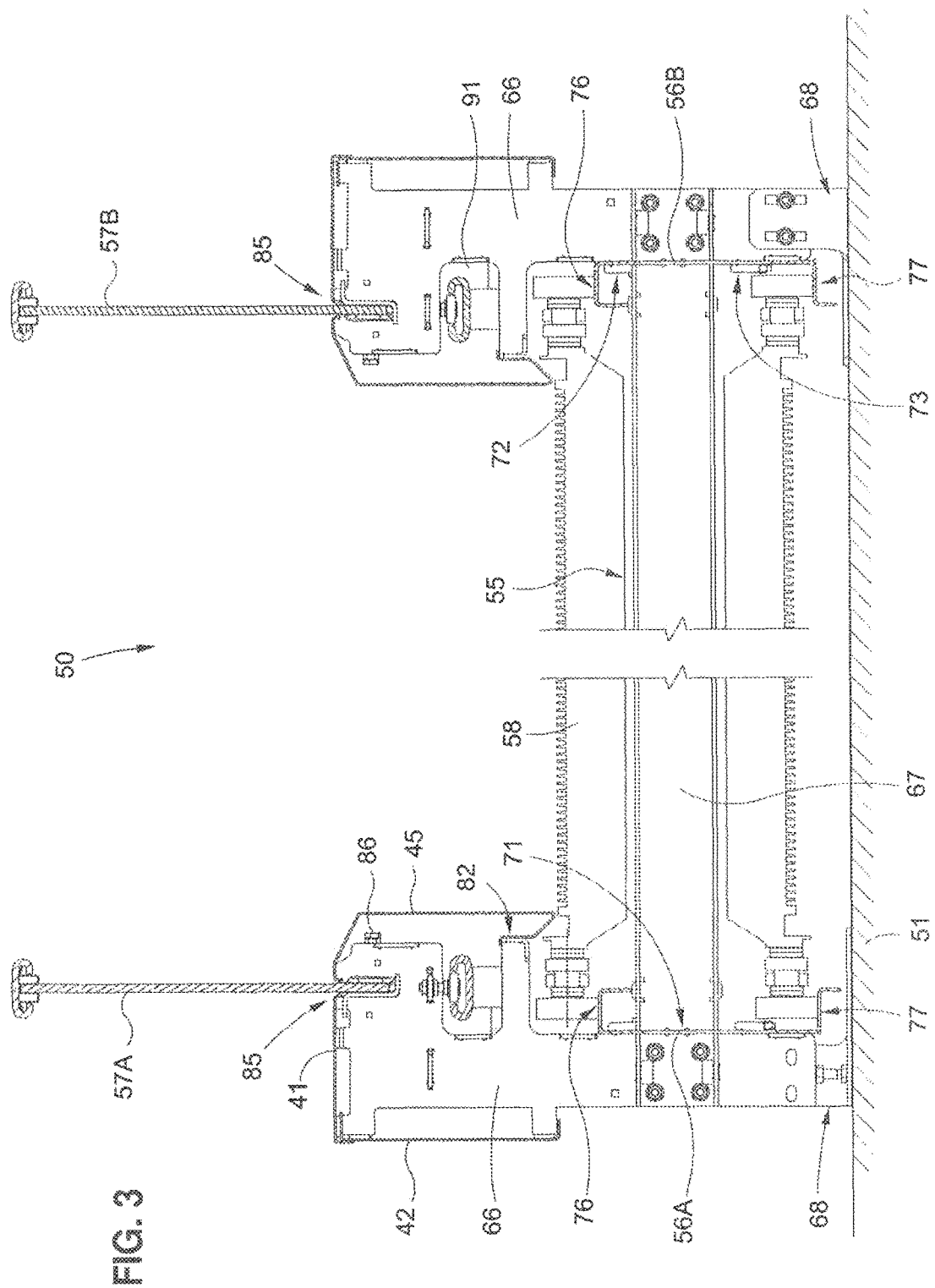
FIG. 3 shows the moving walkway of FIG. 2 in the cross-section A-A.
Figure 4:
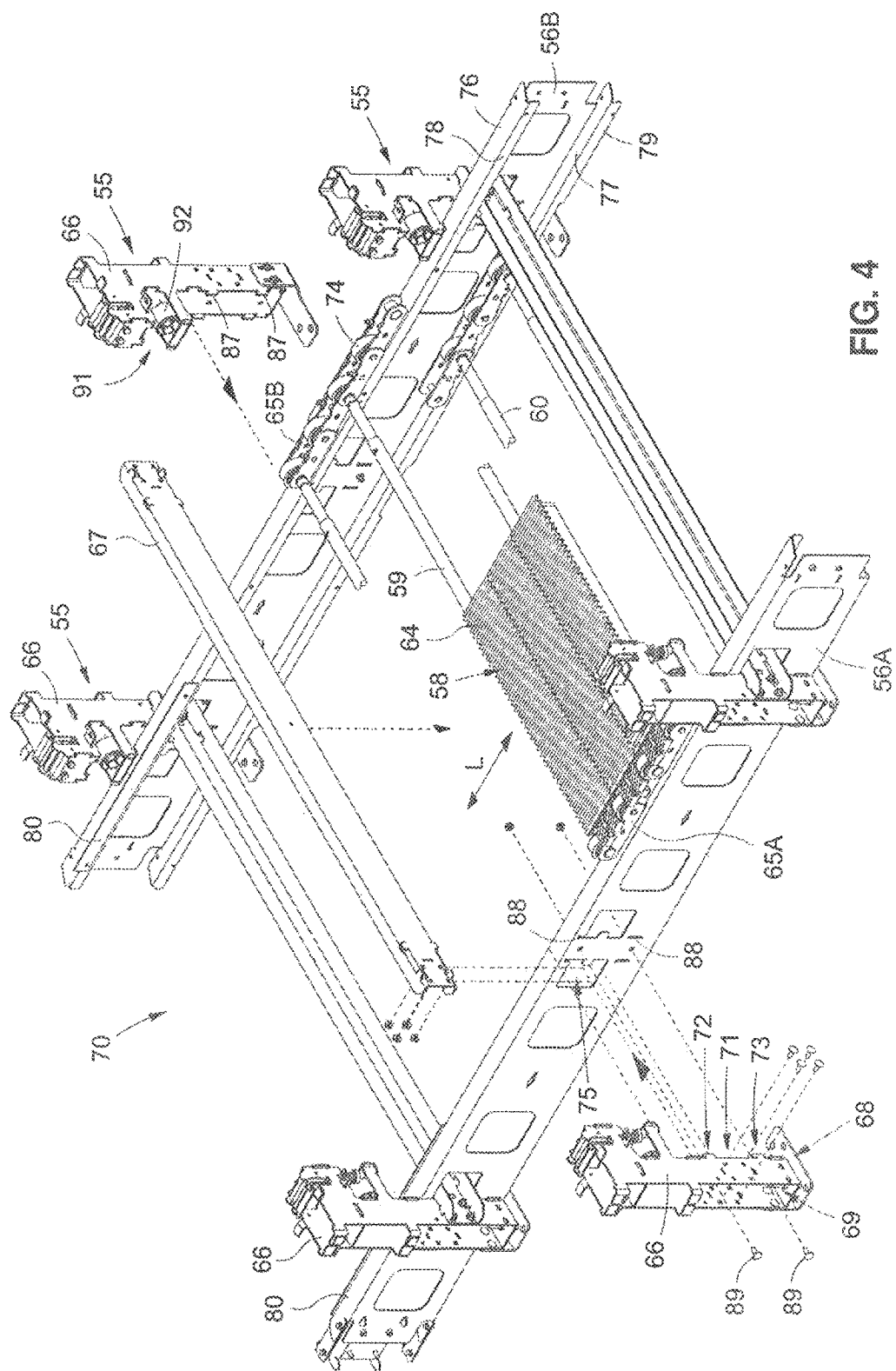
FIG. 4 shows, in three-dimensional view, a track module of the moving walkway of FIG. 2, formed from six supports, three transverse struts and two guide rails, wherein illustrated on each of the guide rails is a respective plate belt section of the plate belt forward run and plate belt return run so as to show the function of the track module.

The moving walkway 50 of FIG. 2 is illustrated in the cross section A-A in FIG. 3. The support structure 55, guide rails 56A, 56B and plate belt 58 correspond with the components illustrated in FIG. 4, for which reason these have the same reference numerals. FIGS. 3 and 4 are described conjunctively in the following.

FIG. 4 shows in three-dimensional view a track module 70 of the moving walkway 50 of FIG. 2, formed from three support structures 55 and two guide rails 56A, 56B or guide-rail sections. Longer track modules 70 with more than three support structures 55 can obviously also be formed. Only a small part of the plate belt 58, namely a plate-belt section 59 of the plate-belt forward run and a plate-belt section 60 of the plate-belt return run, is illustrated on the guide rails 56A, 56B so as to show the function of the guide rails 56A, 56B. The individual plates 64 of the plate belt 58 are, in addition, illustrated only by half so as to show the two plate chains or roller chains 65A, 65B and the guide rollers 74 thereof on either side of the plate belt 58. The support structures 55 each have two supports 66, which are rigidly connected together by a transverse strut 67. The two supports 66 of a support structure 55 have an identical construction, so that a righthand/lefthand association with the guide rails 56A, 56B is not required.

The terms "lower" and "upper" used in the following define the position of the fastening regions at the support 66 in the installed state and refer to the direction of gravitational force. A foot fastening region 68 is formed at the support 66 at the lower end. This region comprises a height adjusting device 69 so as to provide compensation for unevennesses or differences in level of the load-bearing structure (not illustrated). The support 66 has a rail fastening region 71 above the foot fastening region 68. This rail fastening region 71 is divided into an upper rail fastening point 72 and a lower rail fastening point 73, since the transverse strut 67 is fastened to the support 66 between these rail fastening points 72, 73. Detailed explanations with respect to the rail fastening points 72, 73 can be found further below.

In order that the plate belt 58 can freely move in the running direction L the supports 66 have to be arranged on the side of the guide rails 56A, 56B remote from the plate belt 58. In order to make this possible the guide rails 56A, 56B or the illustrated guide-rail sections have, for each transverse strut 67, a passage 75 through which the associated transverse strut 67 extends and is fastened to the support 66. The guide rail 56A, 56B is formed to be C-shaped in cross-section with respect to its length direction and includes not only an upper guide track 76 for the plate-belt section of the forward run 59, but also a lower guide track 77 for the plate-belt section of the return run 60.

In FIG. 3 it can be readily seen that the at least one transverse strut 67 extends through the two guide rails 56A, 56B and that the rail fastening region 71 is divided into an upper rail fastening point 72 and a lower fastening point 73. The two rail fastening points 72, 73 have hooks 87 (reference numeral in FIG. 4) and the guide rails 56A, 56B have slots 88 (visible in FIG. 4) so that the guide rails 56A, 56B can be suspended by the slots 88 in the hooks 87. These joining aids significantly facilitate assembly and contribute to more precise positioning of the guide rail 56A, 56B relative to the supports 66 and transverse strut 67. The guide rails 56A, 56B are secured to the support 66 by means of screws 89, but other known fastening means such as bolts, rivets, weld connections, clinch connections, clamping, snap and key connections, and the like are also usable.

In order to enhance the shape stability of the guide tracks 76, 77 the guide rails 56A, 56B have downwardly directed bent-away portions 78, 79 at the two guide tracks 76, 77. The bent-away portion 78 of the upper guide track 76 is additionally supported by the end thereof on the transverse strut 67, since the guide track 76 of the plate-belt forward run 59 has to support substantially higher conveying loads or weight loads, which are caused by the users of the moving walkway 50, than the guide track 77 of the plate-belt return run 60. Lateral guide strips 80 can be arranged at the bent-away portions 78, 79 or at the guide tracks 76, 77 for lateral guidance of the plate belt 58.

A pedestal fastening region 82, to which a skirt panel 45 is fastened, can also be readily seen in FIG. 3. The balustrade fastening regions 85 with the clamping devices 86, which are arranged thereat, for mounting of the two balustrades 57A, 57B are also illustrated. In addition, further parts of the pedestal such as, for example, cover plates 41, 42 are supported by the supports 66 of the support structure 55 above the foot fastening regions 68 of the supports 66 relative to the load-bearing structure 51.

A handrail-guide fastening region 91, to which guide parts such as the illustrated handrail guide roller 92 can be fastened, is constructed on the support 66 above the rail fastening region 71. Handrail guide rails can obviously also be mounted on these handrail-guide fastening regions 91. In addition, the support 66 can have further fastening regions to which mounts for covers such as, for example, side panels or cover parts of the pedestal can be fastened.

Figure 5:
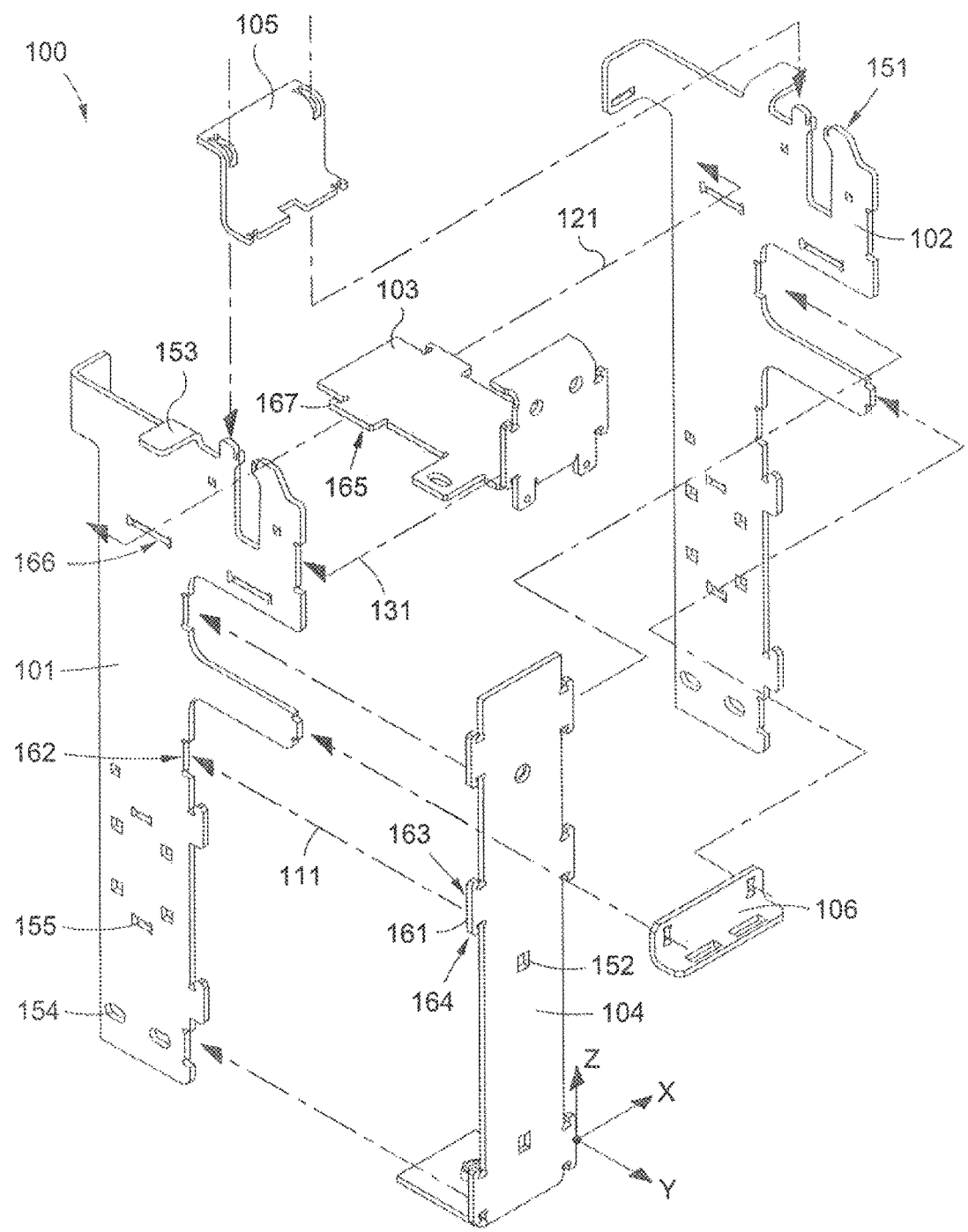
FIG. 5 shows an exploded illustration of a support base body of a support illustrated in FIGS. 1 to 4.

FIG. 5 shows an exploded drawing of a box-shaped support base body 100 of a support 66 illustrated in FIGS. 1 to 4 and 6. The support base body 100 comprises a plurality of plug parts 101 to 106, which in the mounted state are plugged together by means of mechanically positive plug connections 111, 121, 131 to form the box-shaped support base body 100. For the sake of better clarity not all illustrated plug connections are emphasized by dot-dashed lines and only one of the plug connections 111, 121, 131 is fully provided with reference numerals and described in detail. However, it is clearly evident from FIG. 5 that all recognizable mechanically positive plug connections are constructed in the same way.

The plug parts 101 to 106 of the support base body 100 are cut out of planar, distortion-free sheet-metal panels by conventional processing methods such as, for example, laser-beam or water-jet cutting methods. In that case, various recesses 151, cut-outs 152, tongues 153, screw holes 154, slots 155 and the like can be cut at the same time during cutting-out of the plug parts 101 to 106. Individual regions of the cut-out plug parts 101 to 106 can subsequently be bent along intended bending lines. Individual regions of the cut-out plug parts 101 to 106 can obviously also be shaped, for example provided with corrugations.

Each of the plug connections 111, 121, 131 has a tongue 161, 165 and a recess 162, 166 matched in terms of shape to this tongue 161, 165. The recess 162 provided with a reference numeral in the example of the plug connection 111 is formed at the lefthand plug part 101 of the support base body 100. The tongue 161 to be plugged into this recess 162 is formed at the front plug part 104 of the support base body 100, which in the mounted state is arranged adjacent to the lefthand plug part 101 with the recess 162. Not only the tongues 161, 165 of the plug connections 111, 121, 131, but also the recesses 162, 166 can be similarly formed at the same time during cutting-out of the plug parts 101 to 106 from the sheet-metal panels.

The at least one plug connection 111, 121, 131 is preferably so designed that the tongue 161, 165 of the plug connection 111, 121, 131 is insertable into the recess 162, 166 only in a single assembly direction. In the present example this is achieved by the fact that tongue lugs 163, 164 are additionally formed at the tongue 161. Two advantages are thereby achieved. Firstly, there is only a single possibility of how two adjacent plug parts 101 to 106 can be joined together. Thus, the support base body 100 can be assembled even by less qualified employees. Secondly, the plug connection 111, 121, 131 can be so arranged between two plug parts 101 to 106 that the assembly direction thereof is oriented parallelly to the direction of that axis of the triple-axis stress state X, Y, Z in which the smallest stresses or forces are to be expected as a consequence of forces and moments acting on the support base body. Thus, almost all forces and moments arising in these plug connections 111, 121, 131 are mechanically positively accepted by the plug connections 111, 121, 131 or supported in the plug connection 111, 121, 131.

The assembly of the plug part 103, which is at the head end, with the lefthand plug part 101 and with the righthand plug part 102 represents a special feature. In order that the tongue 161 of the plug connection 131 can be plugged into the recess 162, the tongue 165 of the plug connection 121 after insertion into the recess 166 has to be slidable. The slidable tongue 165 also has a lug 167 so that for the plug connection 121, as also for the other plug connections 111, 131, ultimately only one assembly direction, namely the displacement in the recess 166, is defined.

A joined-together plug connection 111, 121, 131 can therefore be secured by the simplest means, since only 'slipping-out' of the tongue 161, 165 from the recess 162, 166 has to be prevented and it is not necessary to transmit substantial tension, compression or shear forces by the securing means to be applied. For preference, at least one of the plug connections 111, 121, 131 of the support base body 100 is secured by way of securing means providing a material couple or mechanically positive couple. As securing means providing a material couple use can be made of, for example, weld seams, weld spots (adhesion points), adhesives, solder connections, plastics material layers applied by means of a dip method, and the like. As securing means providing a mechanically positive couple use can be made of, for example, deformations of the tongue of all kinds such as crushings, upsettings, clinching points, bent-over straps formed at the tongues, and the like. In addition, highly qualified expert employees such as, for example, registered and certified welders are not necessary for securing the plug connections 111, 121, 131.

Thanks to the plug connections 111, 121, 131 the plug parts can be joined together with the support base body 100 with precise fit and free of distortion.

Figure 6:
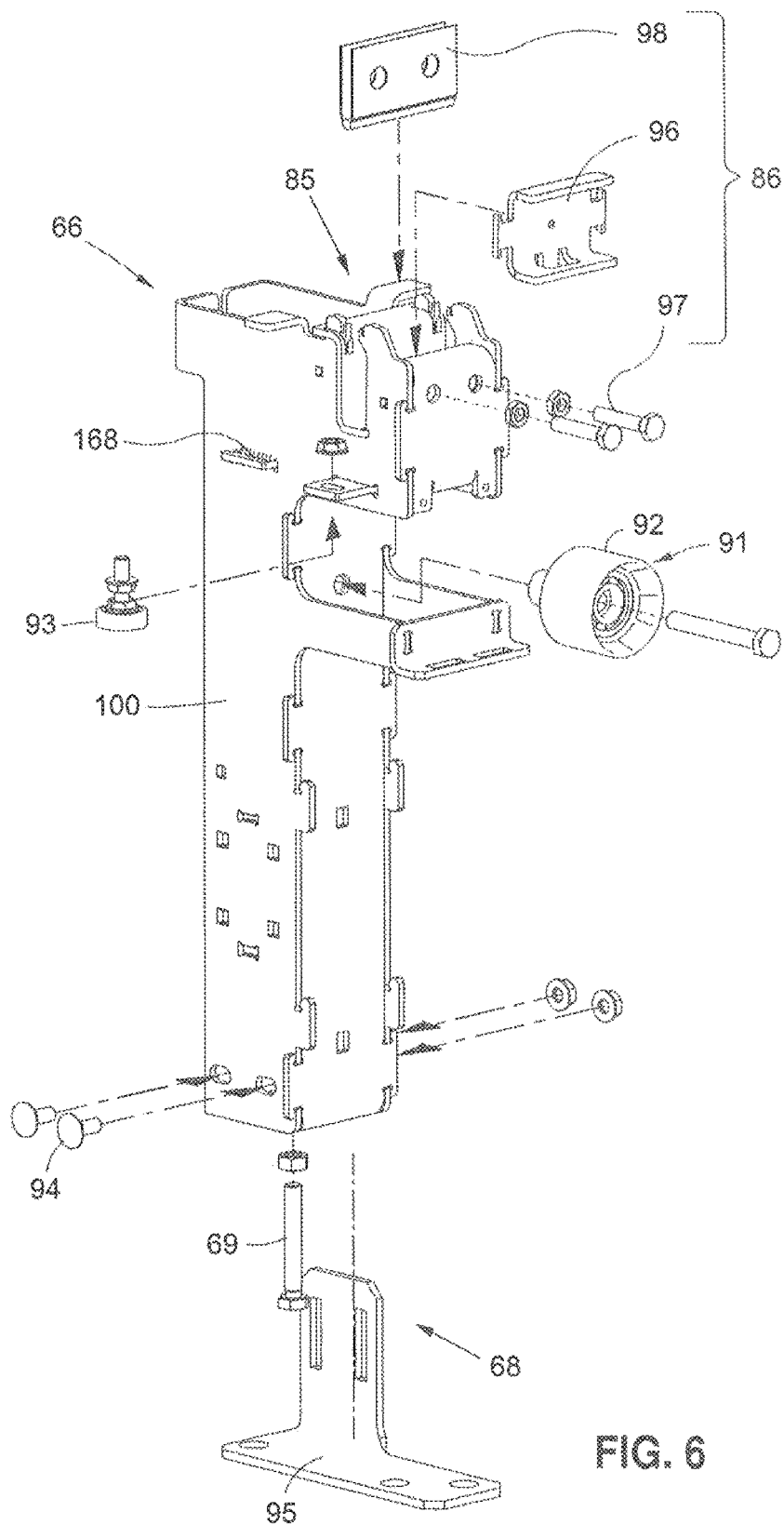
FIG. 6 shows the support base body, which is plugged together in finished state, of FIG. 4 and the components to be attached to complete the support.

FIG. 6 shows the support base body 100 of FIG. 5, which is assembled to finished state and secured by means of adhesive seams 168 (only one adhesive seam 168 illustrated), as well as the components to be attached to complete the support 66.

The foot fastening region 68 of the support 66 is finished by attachment of the foot 95 by means of the screws 94 and the setting screw, which serves as height adjusting device 69, with locknut.

The balustrade fastening region 85 of the support 66 is finished by installation of a clamping device 86. This clamping device 86 comprises a pressure member 96, set screws 97 with locknuts for producing a clamping force between the support base body 100 and the pressure member 96 as well as a resilient insert 98 for protection of a glass panel (not illustrated) of the balustrades 57A, 57B illustrated in FIG. 3.

In addition, a handrail guide roller 92 and a lateral guide roller 93 are fastened to the handrail-guide fastening region 91 of the support 66. After attachment of these components the finished support 66 can, for example, be taken to an assembly location at which a plurality of supports 66, transverse struts 67 and guide rails 56A, 56B are assembled to form track modules 70, as is illustrated in FIG. 4.

Although the invention has been described in detail on the basis of a track module of a moving walkway, it is obvious that a track module of an escalator can also be constructed in the same way. Moreover, the guide track of the plate-belt forward run or step-belt forward run can be formed in a first guide rail and the guide track of the plate-belt return run or step-belt return run can be formed in a second guide rail. In addition, through the escalator according to the invention or the moving walkway according to the invention it is possible on the basis of a combination possibility with a load-bearing structure of any design to create numerous further variants of embodiment with knowledge of the present invention, for example by modernizing existing escalators or moving walkways.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An escalator including a step belt or a moving walkway including a plate belt, the belt being arranged to circulate between a first deflecting region and a second deflecting region, comprising:
   at least one guide rail arranged between the first and second deflecting regions and guiding the belt; and
   at least one support arranged between the deflecting regions and supporting the at least one guide rail, the at least one support including a plurality of plug parts plugged together by plug connections to form a box-shaped support base body, each of the plug connections having a tongue and a recess matched in shape, the recess formed in one of the plug parts and the tongue integrally formed on another of the plug parts, the tongue being plugged into the recess, and each of the plug connections is secured by a securing means providing a material couple or a mechanically positive couple.

2. The escalator or moving walkway according to claim 1 wherein the plug parts are sheet-metal parts or plate parts.

3. The escalator or moving walkway according to claim 1 wherein at least two of the plug connections are provided between two mutually adjacent ones of the plug parts joined together.

4. The escalator or moving walkway according to claim 1 wherein the at least one support has at least one rail fastening region at which the at least one guide rail is fastened.

5. The escalator or moving walkway according to claim 4 wherein hooks suspending the at least one guide rail are formed in the at least one rail fastening region.

6. The escalator or moving walkway according to claim 5 including at least one transverse strut arranged between at least two of the supports orthogonally to a length direction of the escalator or moving walkway and connecting the at least two supports together, and the at least one guide rail is secured by the at least one transverse strut.

7. The escalator or moving walkway according to claim 6 wherein the at least one guide rail has at least one passage guiding the at least one transverse strut.

8. The escalator or moving walkway according to claim 1 wherein the at least one guide rail is C-shaped in cross-section and has two guide tracks for guide rollers of the belt.

9. The escalator or moving walkway according to claim 1 wherein the at least one support has at least one fastening region for fastening components of the escalator or moving walkway, the at least one fastening region being one of:
   a balustrade fastening region for fastening at least one balustrade part;
   a handrail-guide fastening region for fastening a handrail guide;
   a pedestal fastening region for fastening a skirt panel; and
   a foot fastening region for fastening the at least one support to a load-bearing structure.

10. The escalator or moving walkway according to claim 1 including at least one track module formed from at least two support structures and the at least one guide rail, each of the at least two support structures including two of the at least one support connected with a transverse strut, wherein the at least one guide rail is arranged in the at least one track module orthogonally to the transverse struts and is fastened to rail fastening regions of the at least two support structures, the at least one track module being arranged between the deflecting regions.

11. The escalator or moving walkway according to claim 1 wherein the first deflecting region, the second deflecting region and at least one support are fastened to associated mounts, which mounts are arranged in distribution over a length of a load-bearing structure, and the at least one guide rail is fastened to the at least one support.

12. The escalator or moving walkway according to claim 1, wherein the material couple includes a member selected from the group consisting of a weld seam, a weld spot, an adhesive, a solder connection, and a plastics material layer applied by means of a dip method.

13. The escalator or moving walkway according to claim 1, wherein the mechanically positive couple includes a deformation of the tongue selected from the group consisting of a crushing, an upsetting, a clinching point, and a bent-over strap formed at the tongue.

14. A method of producing and assembling at least one support of an escalator including a step belt or a moving walkway including a plate belt, the belt being arranged to circulate between a first deflecting region and a second deflecting region, the method comprising the steps of:
   providing the escalator or the moving walkway including:
      at least one guide rail arranged between the first and second deflecting regions and guiding the belt; and
      at least one support arranged between the deflecting regions and supporting the at least one guide rail, the at least one support including a plurality of plug parts plugged together by plug connections to form a box-shaped support base body, each of the plug connections having a tongue and a recess matched in shape, the recess formed in one of the plug parts and the tongue integrally formed on another of the plug parts, the tongue being plugged into the recess, and each of the plug connections is secured by a securing means providing a material couple or a mechanically positive couple;
   wherein the escalator or the moving walkway is formed by:
      cutting the plug parts from a flat metal sheet or a plate and forming recesses and tongues of the plug connections cutting-out at the plug parts;
      bending or shaping the plug parts;

plugging together the plug parts by the plug connections to form the box-shaped support base body; and
fastening at least one component to the support base body for completing the at least one support.

15. The method according to claim 14, further comprising providing the support base body with a surface treatment.

16. A method of modernizing an escalator or a moving walkway, wherein an existing escalator or an existing moving walkway is removed down to an empty framework and the escalator including a step belt or moving walkway including a plate belt, the belt being arranged to circulate between a first deflecting region and a second deflecting region, is installed, comprising the steps of:
   providing the escalator or the moving walkway including:
      at least one guide rail arranged between the first and second deflecting regions and guiding the belt; and
      at least one support arranged between the deflecting regions and supporting the at least one guide rail, the at least one support including a plurality of plug parts plugged together by plug connections to form a box-shaped support base body, each of the plug connections having a tongue and a recess matched in shape, the recess formed in one of the plug parts and the tongue integrally formed on another of the plug parts, the tongue being plugged into the recess, and each of the plug connections is secured by a securing means providing a material couple or a mechanically positive couple;
wherein the escalator or the moving walkway is modernized by:
   using the empty framework as load-bearing structure and providing mounts on the framework; and
   fastening the first deflecting region, the second deflecting region and the at least one support in the empty framework by connecting the at least one support with at least one of the mounts.

\* \* \* \* \*